(12) United States Patent
Becker et al.

(10) Patent No.: US 6,286,051 B1
(45) Date of Patent: Sep. 4, 2001

(54) METHOD AND APPARATUS FOR EXTENDING A JAVA ARCHIVE FILE

(75) Inventors: Craig Henry Becker; John Cook, both of Austin; Troy Douglas Folger, Round Rock; James Irwin Knutson, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/968,720

(22) Filed: Nov. 12, 1997

(51) Int. Cl.$^7$ .................................................. G06F 17/30
(52) U.S. Cl. ........................ 709/236; 709/310; 707/104; 717/1
(58) Field of Search ..................... 709/300, 303, 709/219, 203, 315, 310, 311, 319, 328, 330, 246, 236; 707/103; 751/100, 103, 104; 717/1, 3

(56) References Cited

U.S. PATENT DOCUMENTS

| | | | | |
|---|---|---|---|---|
| 5,551,028 | * | 8/1996 | Voll et al. ............................ | 707/103 |
| 5,671,412 | * | 9/1997 | Christiano .......................... | 707/104 |
| 5,835,712 | * | 11/1998 | Dufresne ............................. | 709/203 |
| 5,842,213 | * | 11/1998 | Odom et al. ........................ | 707/100 |
| 5,862,325 | * | 1/1999 | Reed et al. .......................... | 709/201 |
| 5,893,908 | * | 4/1999 | Cullen et al. ........................ | 707/5 |
| 6,018,772 | * | 1/2000 | Kamalski ............................ | 709/236 |
| 6,026,437 | * | 2/2000 | Muschett et al. .................... | 709/219 |

OTHER PUBLICATIONS

Sun Microsystems "JavaBeans" Version 1.01—Graham Hamilton (Editor) Jul. 1997.*

* cited by examiner

*Primary Examiner*—Dung C. Dinh
(74) *Attorney, Agent, or Firm*—David A. Mims, Jr.

(57) ABSTRACT

A method and apparatus for extending a Java Beans Archive file. A key/value pair is added to the manifest file specification to allow an application to determine information about the sub-element composition of a Java Bean. The key provides a unique integer "N" which allows the specification of a Java Bean in the archive file. The value pair provides specification for a tag for indicating the type of a specific sub-element file in the archive file.

15 Claims, 4 Drawing Sheets

METHOD AND APPARATUS FOR EXTENDING A JAVA ARCHIVE FILE

CROSS REFERENCE TO RELATED APPLICATIONS

This application is related in subject matter to the following application filed concurrently herewith and assigned to a common assignee:

Application Ser. No. 08/968,719 filed by Craig Becker, John Cook, Troy Folger and Jim Knutson entitled, "Method and Apparatus For A Data Model Structure For Accessing and Manipulating Java Beans" pending.

The foregoing co-pending application is incorporated herein by reference.

FIELD OF THE INVENTION

The present invention relates to data processing systems, and more particularly, to a methodology and structure for extending the file format of an archived object-oriented object.

BACKGROUND OF THE INVENTION

Over the past few years, constructing applications by assembling reusable software components has emerged as a highly productive and widely accepted way to develop custom applications. First generation products such as Microsoft's Visual Basic, with its VBX components and "forms-based" applications assembly process proved to be very useful in building a broad spectrum of applications. Visual Basic has been followed by other products such as Borland's Delphi, which further enhanced the basic component assembly application development model by adding more powerful data access components and object-oriented component extension capabilities.

The release of a windowing system, Internet protocol and platform independent product named Java represented an even further advance. Java represents an object-oriented language which satisfies the public's desire to animate and add dynamism to the static web pages of the Internet. More importantly, Java's platform independence levels the playing field for software vendors, enabling them to escape the dominance of a single supplier. Java permits writing to a virtual platform which is installed on most desktop web browsers. System managers have quickly recognized the advantage of a single master copy of programs that are stored in one place, ideal for easy update, that downloads to the client for the duration of the session, thus exploiting the users desktop processor in a client/server model but without the client side maintenance and version control costs. For details and background with respect to the Java System, reference may be made to a typical text, "Just Java", 2nd Edition, Peter van der Linden, Sun Microsystems, 1997.

More recently, the introduction of Java Beans has taken the component software assembly paradigm to a new level. Java Beans is an architecture and platform-neutral Application Programming Interface (API) for creating and using dynamic Java components. Java Beans and their common properties and functions are described in detail in the text, "Java in a Nutshell, 2nd. Edition, David Flanagan, O'Reilly and Assoc. Inc., 1997. Java Beans enhance the Java platform by allowing richer, more dynamic interaction. Java Beans allow developers to define independent components that can be used and re-used in a variety of combinations to compose new applications inside a variety of browser and non-browser environments. Java Beans components can be GUI widgets, non-visual functions and services, applets and more full-scale applications. Each of these components can be built by different developers at separate times. Java Beans components do not need to be part of the same application build but communicate dynamically.

Java employs a platform independent file format that concatenates and compresses many Java class, image and audio files into one called a JAR (Java Archive) file. One of the main attributes of the JAR file is to reduce the number of HTTP (HyperText Transfer Protocol) connections that need to be opened, thus reducing download times. The JAR file format is the popular ZIP format and is used as a general archiving tool. The JAR file archive format for Java Beans contains a Manifest file (MANIFEST.MF) which provides the basic information about the sub-element composition of a Java Bean. The Manifest file enables the association of attributes to files. There are a number of pre-defined attributes. For example, one of them is the "Java Bean:" attribute. A sub-element is a Java Bean if its "Java Bean:" attribute has the value "True".

However, there are limited abilities in JAR files for building rich associations between the sub-elements contained within the JAR file. Tools and programmers working in a Java Bean development environment need to be able to examine, add, change, or delete the associations between the sub-elements that make up a Java Bean and that make up the total JAR file. They are constrained in their ability to do this by the conventions and mechanics of the attribute mechanism in the Manifest file. It is very difficult, for instance, for a program to know with which Java Bean certain file sub-elements are associated, when more than one Java Bean resides in a JAR file. If an icon file, for instance, is present in the JAR file, does that icon file apply to the first Java Bean, to the last, or at all?

Consequently, it would be desirable to provide a methodology and structure for providing additional information about the Java Beans stored in a Java Archive file.

SUMMARY OF THE INVENTION

This invention relates to a method and structure for extending a Java Beans Archive file. A key/value pair is added to the manifest file specification to allow an application to determine information about the sub-element composition of a Java Bean. The key provides a unique integer "N" which allows the specification of each Java Bean in the archive file. The value provides a tag for indicating the type of a specific sub-element file in the archive file.

DETAILED DESCRIPTION OF THE EMBODIMENTS

This invention provides methodologies and structures for extending a Java Archive manifest file specification used for storing and transmitting a Java Bean. A Java Bean, or just Bean, consists of one or more files, each containing compiled Java code or data, that is associated with the Java Bean. A Bean is a software component which can be visually manipulated in development environments. Beans provide an effective way of creating Java applets and applications. In addition, Bean components can be created which are as complex as existing applications, like a spreadsheet or as simple as a button on a GUI.

Figure 1:
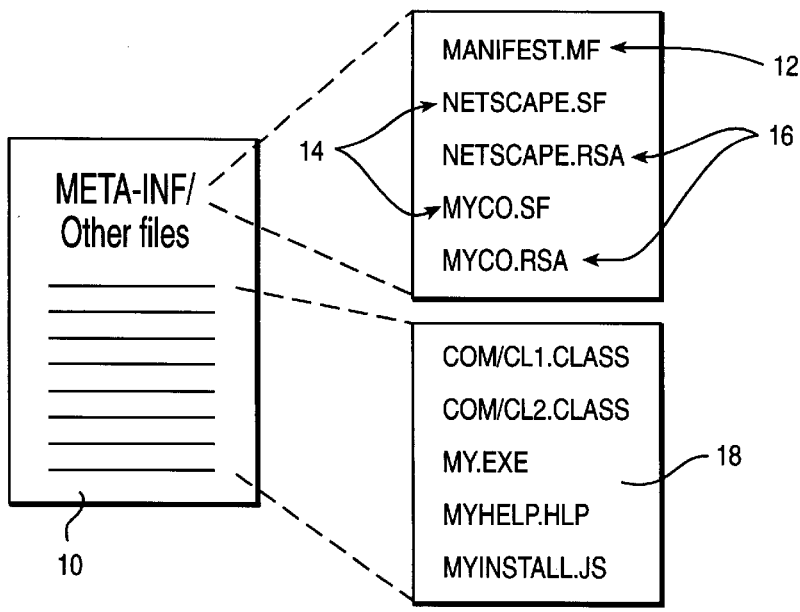
FIG. 1 illustrates the format for a Java Archive file.

Java Beans are typically distributed and installed in a development environment by packaging them in a JAR (Java ARchive) file. These files are essentially ZIP files that are created using a JAR utility. When Beans are shipped as part of a JAR file, the term Bean may also refer to a serialized version of the Bean which is used to instantiate the Bean. Referring to FIG. 1, there is shown the format for a JAR file. The JAR file has a standard subdirectory of meta-information that is always named META-INF 10. The subdirectory 10 contains a single manifest file that is always named MANIFEST.MF 12. The MANIFEST.MF 12 file contains arbitrary information about the files in the archive, such as their encoding or language. The information about the files is stored as sets of key-value pairs in text form. The JAR file is also capable of containing zero or more signature files with a standard filename suffix of .SF 14. There is one of these files for each entry that has signed files in the archive. In addition, the JAR file may contain zero or more digital signature files 16, where the suffix of the signature 16 (for example, .RSA) has a one to one correspondence with the algorithm and format used to compute the signature.

In addition to the MANIFEST.MF 12 subdirectory, the archive contains whatever files 18 a user wishes to package in the archive, such as files to be installed for an automatic software installation feature. This invention extends the manifest file specification of the Java Bean Archive file so that information is available on which sub-element is the "Bean class file", which is the BeanInfo class, which is the Customizer class, which files contains icons, which contain source code, etc. Additionally, in cases where two or more Java Beans reside in a JAR file, the user is able to determine which sub-element files are associated with which Java Bean.

Figure 2:
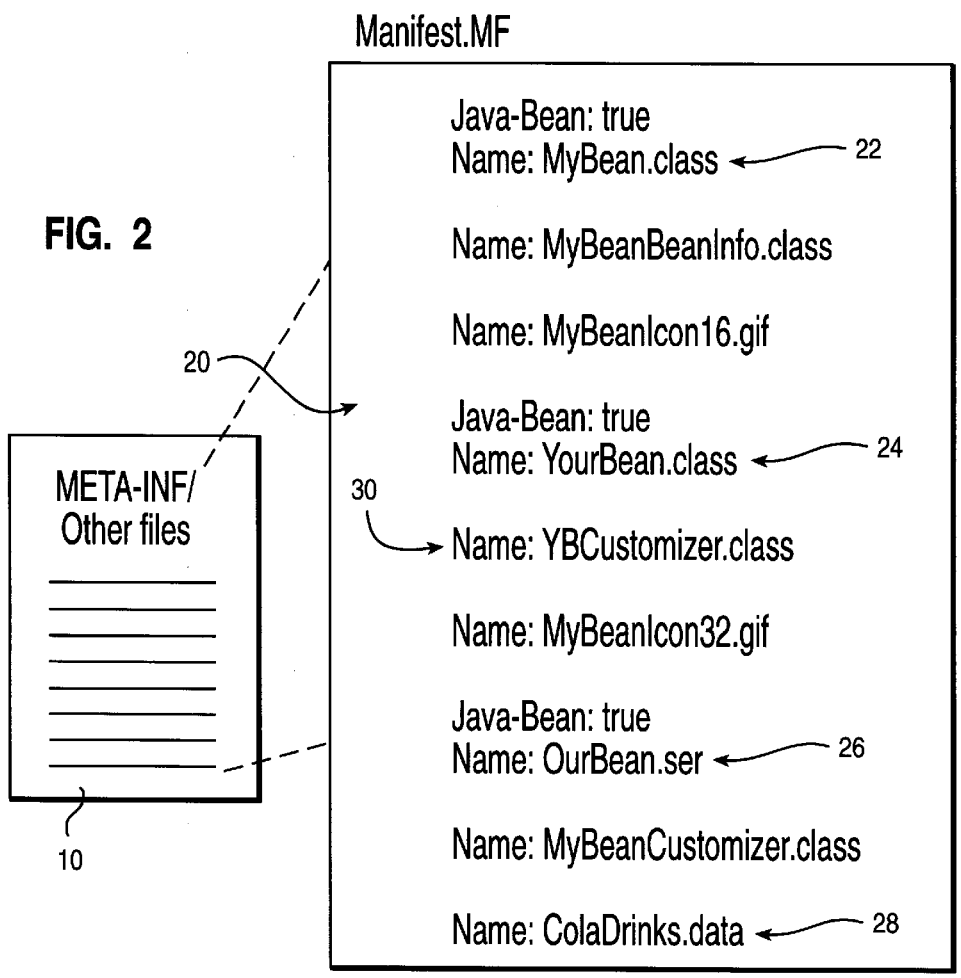
FIG. 2 is the prior art structure for storing Java Beans in a Java Archive file.

Referring now to FIG. 2, there is shown a sample plain Manifest file 20 of a prior art Java Archive file. The Manifest file 20 contains three Java Beans which have been designated YourBean 24, MyBean 22 and OurBean 26. The sample Manifest file 20 highlights a problem typically found with the implementation, namely, which Java Bean utilizes ColaDrinks.data 28. Likewise, it is relatively obvious to a user that YBCustomizer.class 30 is a sub-element of Your-Bean 24, however determining the sub-elements programmatically is problematic.

Figure 3:
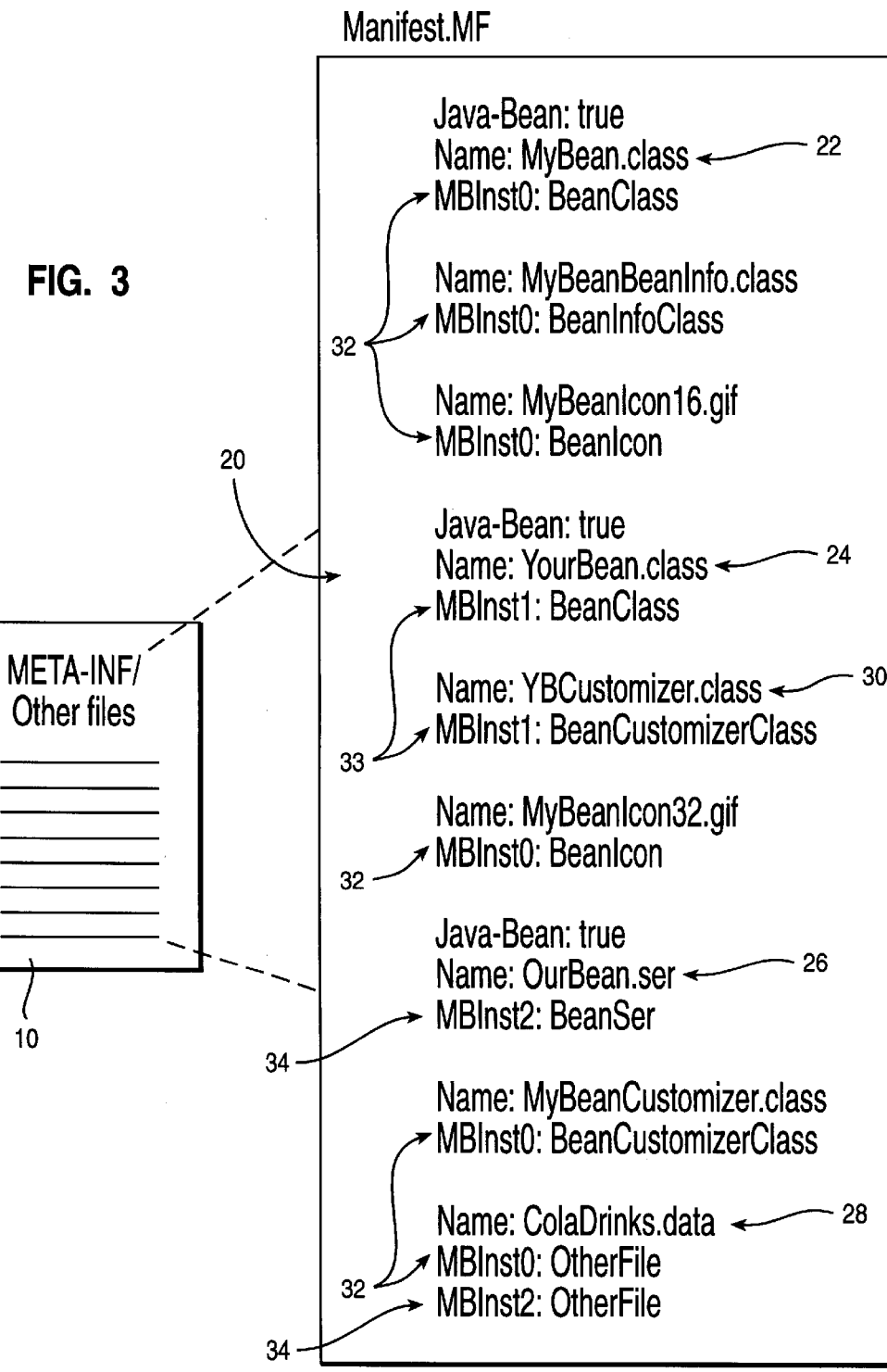
FIG. 3 is a key:value pair for storing Java Beans in a Java Archive file as disclosed in this invention.

Referring now to FIG. 3, there is shown a Manifest file 20 using the key:value pair MBInstN:<sub-element type descriptor>, where N is a unique integer corresponding to a Java Bean in a JAR file, and <sub-element type descriptor> is a tag that indicates the type of a specific sub-element file. The key:value extensions allow a Java Bean sub-element to be tied unambiguously to a set of sub-element types. In addition, the invention permits a Java Bean sub-element to be unambiguously affiliated with its Java Bean. Turning again to FIG. 3, the presence of the key:value pairs provides a better understanding of the relationships between the various sub-elements. All sub-elements that have the tag MBInst0 32 are affiliated with the Java Bean called MyBean 22. Likewise, all sub-elements that have the tag MBInst1 33 are affiliated with the Java Bean called YourBean 24. Finally, all sub-elements that have the tag MBInst2 (34) are affiliated with the Java Bean called OurBean 26. It is readily apparent that the YBCustomizer.class 30 is a Bean Customizer class that is part of YourBean 24. It is also readily discernable, programmatically or by a user, that ColaDrinks.data 28 is affiliated with both MyBean 22 and OurBean 26. One skilled in the art appreciates that the invention solves the basic problem of which element is the main element for a Java Bean, but also identifies when a Java Bean sub-element serves two or more different functions, in two or more different Beans. For example, if a sub-element BeanMain.class is used as the Bean in one Bean, but has been subclassed by a second Bean (e.g., means it no longer "main"), it will appear as follows:

Name: BeanMain.class
MBInst0: MBBeanClass
MBInst1: MBOtherClass

Figure 4:
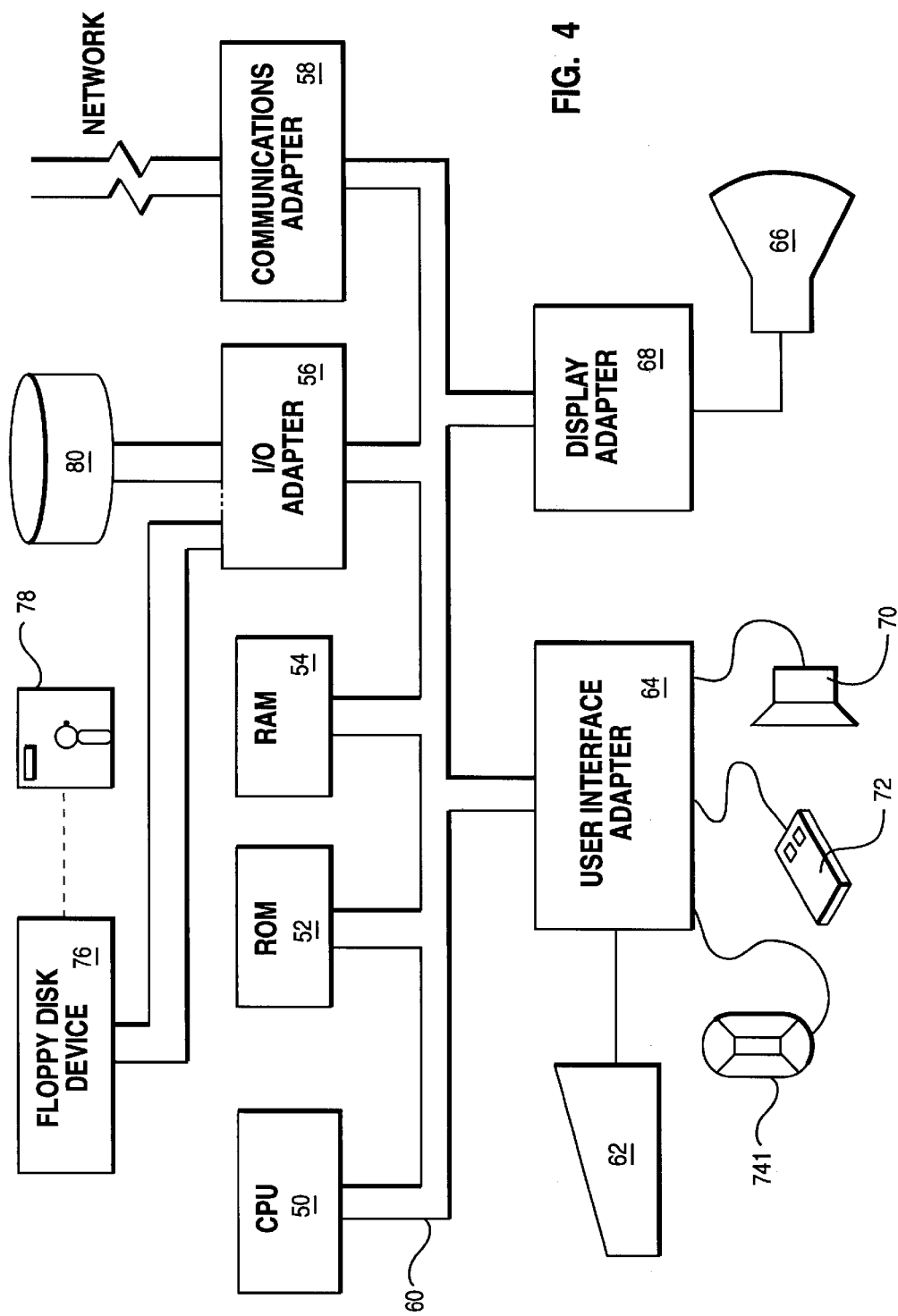
FIG. 4 is an illustrative embodiment of a computer system/workstation where the present invention may be practiced.

Referring now to FIG. 4, there is shown a pictorial representation of a workstation, having a central processing unit 50, such as a conventional microprocessor, and a number of other units interconnected via a system bus 60. The workstation shown in FIG. 4, includes a Random Access Memory (RAM) 54, Read Only Memory (ROM) 52, an I/O adapter 56 for connecting peripheral devices such as floppy disk unit 76 to the bus, a user interface adapter 64 for connecting a keyboard 62, a mouse 72, a speaker 70, a microphone 74, and/or other user interface devices such as a touch screen device (not shown) to the bus, a communication adapter 58, for connecting the workstation to a data processing network and a display adapter 68, for connecting the bus to a display device 66. The workstation, in the preferred embodiment, has resident thereon the computer software making up this invention, which may be loaded from diskette 78.

Figure 5:
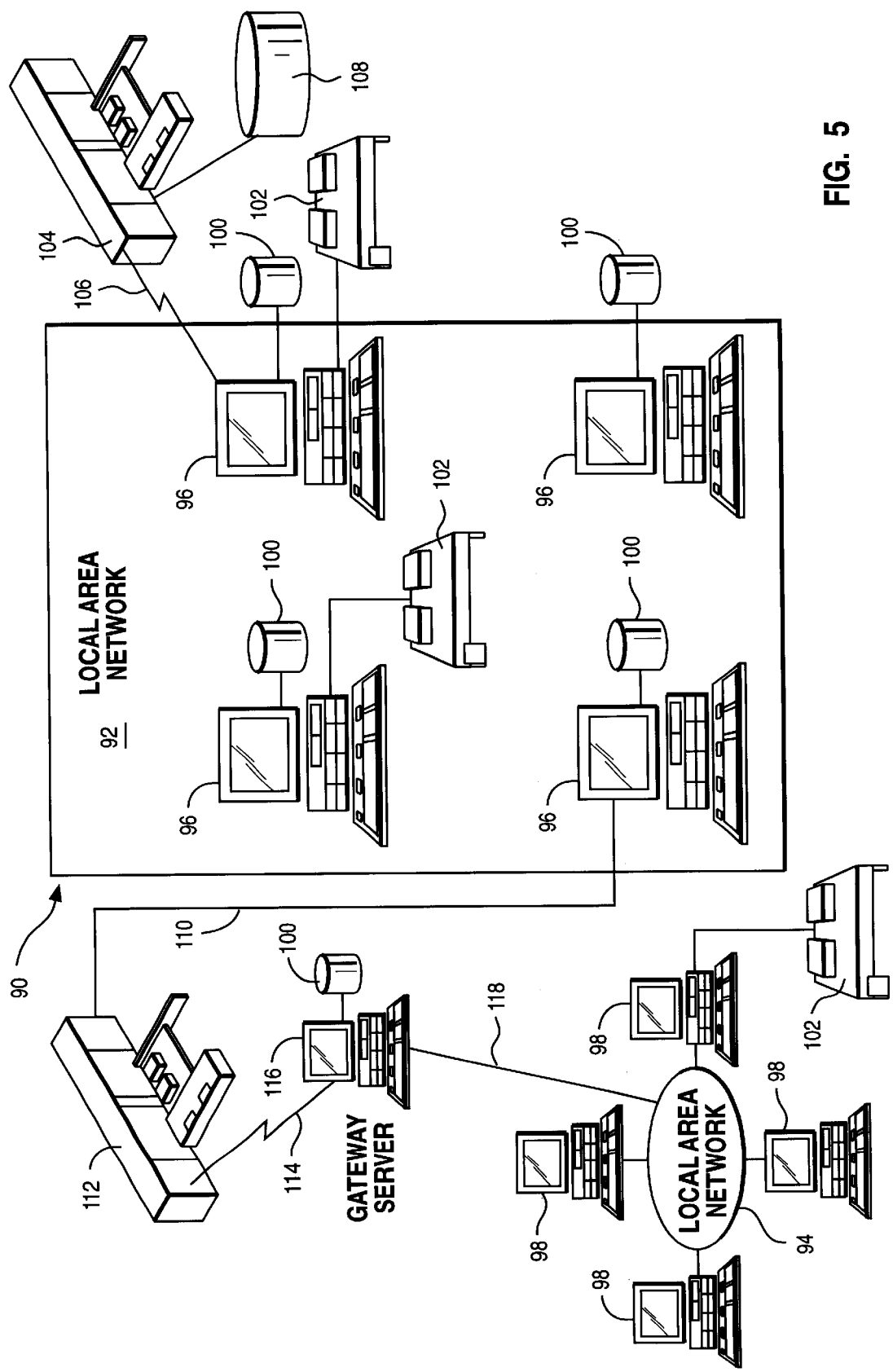
FIG. 5 is an illustrative embodiment of a computer network where the present invention may be practiced.

A representative network environment where this invention may be practiced is depicted in FIG. 5, which illustrates a pictorial representation of a distributed data processing system 90. As illustrated, data processing system 90 contains a plurality of networks, including local area networks (LAN) 92 and 94, each of which preferably includes a plurality of individual computers 96 and 98, respectively as shown in FIG. 4. One skilled in the art will appreciate that a plurality of workstations coupled to a host processor may be utilized for each such network. As is common in such data processing systems, each computer 96 and 98, may be coupled to a storage device 100, and a printer 102.

Data processing system 90 further includes one or more mainframe computers, such as mainframe computer 104, which may be preferably coupled to LAN 92 by means of a communication link 106. Mainframe computer 104 is preferably coupled to a storage device 108, which serves as remote storage for LAN 92. LAN 92 is also coupled via communications link 110 through communications controller 112 and communications link 114 to gateway server 116. Gateway server 116 is preferably a workstation which serves to link LAN 94 to LAN 92 via communications link 118. As understood by one skilled in the art, data processing system 90 additionally includes unillustrated gateways, routers, bridges, and various other network hardware utilized to interconnect the segments of data processing system 90.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for identifying information about a plurality of Java Beans in a Java Archive file, comprising the steps of:

generating a key within a manifest file in the Java Archive file for a selected one of said Java Beans having a unique integer identifying said selected Java Bean in said computer system;

generating a first tag for said selected Java Bean indicating a type of a specific sub-element file within the manifest file in the Java Archive file; and associating said tag with said key for identifying information for said selected Java Bean within the manifest file in the Java Archive file in said computer system.

2. The method of claim 1 wherein said step of generating a key further comprises:

assigning to said unique integer a value "N" by a user in said computer system identifying said selected one of said plurality of Java Beans within the manifest file in the Java Archive file.

3. The method of claim 1 wherein said step of generating a tag further comprises:

designating a sub-element type descriptor for said tag for said selected one of said plurality of Java Beans in said computer system.

4. The method of claim 1 wherein said step of associating said tag further comprises:

generating a second tag for a different one of said Java Beans in the manifest file in the Java Archive file in said computer system; and associating said second tag with said key to identify information for said Java Bean in the manifest file in said Java Archive file.

5. The method of claim 4 wherein said first tag identifies a class file and said second tag identifies a data file.

6. An apparatus for identifying information about a plurality of Java Beans in a Java Archive file, comprising:

means for generating a key within a manifest file in the Java Archive file for a selected one of said Java Beans having a unique integer identifying said selected Java Bean in said computer system;

means for generating a first tag for said selected Java Bean indicating a type of a specific sub-element file within the manifest file in the Java Archive file; and means for associating said tag with said key for identifying information for said selected Java Bean within the manifest file in the Java Archive file in said computer system.

7. The apparatus of claim 6 wherein said means for generating a key further comprises:

means for assigning to said unique integer a value "N" by a user in said computer system identifying said selected one of said plurality of Java Beans within the manifest file in the Java Archive file.

8. The apparatus of claim 6 wherein said means for generating a tag further comprises:

means for designating a sub-element type descriptor for said tag for said selected one of said plurality of Java Beans in said computer system.

9. The apparatus of claim 6 wherein said means for associating said tag further comprises:

means for generating a second tag for a different one of said Java Beans in the manifest file in the Java Archive file in said computer system; and means for associating said second tag with said key to identify information for said Java Bean in the manifest file in said Java Archive file.

10. The apparatus of claim 7 wherein said first tag identifies a class file and said second tag identifies a data file.

11. A computer program product having a computer readable medium having computer program logic recorded thereon for identifying information about a plurality of Java Beans in a Java Archive file, comprising:

computer readable means for generating a key within a manifest file in the Java Archive file for a selected one of said Java Beans having a unique integer identifying said selected Java Bean in said computer system;

computer readable means for generating a first tag for said selected Java Bean indicating a type of a specific sub-element file within the manifest file in the Java Archive file; and computer readable means for associating said tag with said key for identifying information for said selected Java Bean within the manifest file in the Java Archive file in said computer system.

12. A computer program product of claim 11 wherein said computer readable means for generating a key further comprises:

computer readable means for assigning to said unique integer a value "N" by a user in said computer system identifying said selected one of said plurality of Java Beans within the manifest file in the Java Archive file.

13. A computer program product of claim 11 wherein said computer readable means for generating a tag further comprises:

computer readable means for designating a sub-element type descriptor for said tag for said selected one of said plurality of Java Beans in said computer system.

14. A computer program product of claim 11 wherein said computer readable means for associating said tag further comprises:

computer readable means for generating a second tag for a different one of said Java Beans in the manifest file in the Java Archive file in said computer system; and computer readable means for associating said second tag with said key to identify information for said Java Bean in the manifest file in said Java Archive file.

15. A computer program product of claim 12 wherein said first tag identifies a class file and said second tag identifies a data file.

* * * * *